United States Patent
Lu et al.

(10) Patent No.: US 10,100,238 B2
(45) Date of Patent: *Oct. 16, 2018

(54) LIQUID OPTICALLY CLEAR PHOTO-CURABLE ADHESIVE

(71) Applicants: HENKEL IP & HOLDING GMBH, Duesseldorf (DE); Henkel AG & Co. KGaA, Duesseldorf (DE)

(72) Inventors: Daniel Lu, Chandler, AZ (US); Masao Kanari, Kawasaki (JP); Junichi Sawanobori, Kanagawa (JP)

(73) Assignees: Henkel IP & Holding GmbH, Duesseldorf (DE); Henkel AG & Co. KGaA, Duesseldorf (DE)

( * ) Notice: Subject to any disclaimer, the term of this patent is extended or adjusted under 35 U.S.C. 154(b) by 457 days.

This patent is subject to a terminal disclaimer.

(21) Appl. No.: 14/550,403

(22) Filed: Nov. 21, 2014

(65) Prior Publication Data

US 2015/0075710 A1 Mar. 19, 2015

Related U.S. Application Data

(63) Continuation of application No. PCT/CN2012/075890, filed on May 22, 2012.

(51) Int. Cl.
*C09J 147/00* (2006.01)
*C09J 4/00* (2006.01)
*B32B 37/12* (2006.01)
*B32B 37/18* (2006.01)
*B32B 38/00* (2006.01)
*C09J 5/00* (2006.01)
*C08F 220/18* (2006.01)
*C08F 222/10* (2006.01)

(52) U.S. Cl.
CPC ............ *C09J 147/00* (2013.01); *B32B 37/12* (2013.01); *B32B 37/18* (2013.01); *B32B 38/0008* (2013.01); *C09J 4/00* (2013.01); *C09J 5/00* (2013.01); *B32B 2457/202* (2013.01); *B32B 2457/208* (2013.01); *B32B 2551/00* (2013.01); *C08F 220/18* (2013.01); *C08F 2222/1086* (2013.01)

(58) Field of Classification Search
None
See application file for complete search history.

(56) References Cited

U.S. PATENT DOCUMENTS

| 5,384,341 A | * | 1/1995 | Itagaki | C08F 299/00 522/111 |
| 6,337,118 B1 | * | 1/2002 | Takehana | B32B 7/12 428/64.1 |
| 6,596,787 B1 | | 7/2003 | Levandoski et al. | |
| 2007/0154240 A1 | * | 7/2007 | Elbert | G03G 15/0808 399/176 |
| 2011/0092049 A1 | | 4/2011 | Chen et al. | |
| 2011/0184125 A1 | * | 7/2011 | Zhao | C08G 18/4288 525/131 |
| 2011/0201717 A1 | * | 8/2011 | Held | C09J 4/00 522/33 |
| 2012/0048184 A1 | * | 3/2012 | Lee | C08G 79/00 118/264 |

FOREIGN PATENT DOCUMENTS

| CN | 101086952 A | 12/2007 | |
| CN | 101235229 A | 12/2009 | |
| CN | 101614954 A | 12/2009 | |
| CN | 101970590 A | 2/2011 | |
| CN | 102153953 A | 8/2011 | |
| JP | 2005308811 A | 11/2000 | |
| WO | 2013173976 A1 | 8/2008 | |
| WO | WO 2009086491 A1 * | 7/2009 | ............ C09J 4/00 |
| WO | WO 2010034699 A1 * | 4/2010 | ........ C08G 18/4288 |
| WO | 2013173977 A1 | 11/2013 | |

OTHER PUBLICATIONS

Technical Data for urethane acrylate oligomer UV-3630ID80, Nippon Gohsei, retrieved on Mar. 10, 2017 (Year: 2017).*
Yamamoto, Takuya et al., "Curable Resin Composition for Liquid Crystal Display Element, Sealant for Liquid Crystal Dispensing Method, Vertically Conducting Material and Liquid Crystal Display Element", machine translation of JP 2005-308811A, published Nov. 4, 2005. (Year: 2005).*

* cited by examiner

*Primary Examiner* — Anish P Desai
(74) *Attorney, Agent, or Firm* — Steven C. Bauman

(57) ABSTRACT

A liquid photo-curable adhesive composition comprising:
(a) 5 to 30 wt % of urethane acrylate,
(b) 30 to 80 wt % of plasticizer,
(c) 0.02 to 5 wt % of photo initiator,
(d) 0 to 30 wt % of acrylate monomers and/or oligomer,
is described.

6 Claims, No Drawings

LIQUID OPTICALLY CLEAR PHOTO-CURABLE ADHESIVE

The present disclosure relates to a specific liquid optically clear photo-curable adhesive and to several uses of this adhesive. It further relates to the bonding of substrates with a liquid optically clear photo-curable adhesive and it also relates to optical assemblies that include such optical clear adhesives.

Optically clear adhesives and especially liquid optically clear adhesives are finding wide applications in optical displays. Optical bonding in display applications is used to bond optical elements such as display panels, glass plates, touch panels, diffusers, rigid compensators, heaters, and flexible films such as polarizers and retarders. Especially the use of such adhesives for bonding in touch displays, for example, capacitive touch displays is of high interest. The importance of optically clear adhesives is still growing since the continuous development of new electronic display products, such as wireless reading devices, increases the demands for optically clear adhesives. But there are still some challenges to be mastered. A key problem is the Mura. "Mura" is a Japanese term for "unevenness." Dark spots or patches may occasionally appear on some liquid crystal display (LCD) panels. This clouding phenomenon is recognized as "Mura". "Mura" is used to describe a low-contrast, irregular pattern or region that causes uneven screen uniformity under certain conditions. Mura is therefore a display effect and can be caused by stress imposed to the LCD. Any kind of stress, even at low level, might cause Mura to a LCD. As Mura is not repairable, there is the continuous need to overcome Mura. While thickness of display is becoming thinner and thinner, for example in smart phones, the Mura problem due to stress between LCD/OLED display and top lens, touch panel or other support is even becoming more critical.

The Mura problem is solved by the subject matter of this invention, which is a liquid optically clear photo-curable adhesive composition comprising:
  (a) 5 to 30 wt % of urethane acrylate,
  (b) 30 to 80 wt % of plasticizer,
  (c) 0.02 to 5 wt %, preferably 0.2 to 5 wt %, of photo initiator,
  (d) 0 to 30 wt %, preferably 0.01 to 20 wt %, of acrylate monomers and/or oligomer.

This liquid optically clear photo-curable adhesive enables the bonding of parts of optical assemblies, for example bonding the cover lens to a LCD module without any Mura problem or at least the best possible prevention of Mura.

The term "liquid optically clear photo-curable adhesive" is well established in the art and well known to the person skilled in the art. Liquid optically-clear adhesive (LOCA) is widely used in touch panels and display devices to bind the cover lens, plastic or other optical materials to the main sensor unit or to each other. Liquid optically-clear adhesives are generally used to improve the optical characteristics of the device as well as improve other attributes such as durability. The liquid optically clear photo-curable adhesive is generally used for example to bond the touch panel to the main liquid crystal display, and also to bond any protective cover, such as the lens, to the touch panel. Major applications of liquid optically clear photo-curable adhesive include capacitive touch panels, 3D televisions and glass retarders. In particular the adhesive is optically clear, if it exhibits an optical transmission of at least 85%. The measurement of optical transmission is known to the person skilled in the art. It can preferably be measured on a 100 μm thick sample according to the following preferred testing method.

Preferred Testing Method for Transmission:

A small drop of optically clear adhesive is placed on a 75 mm by 50 mm plain micro slide (a glass slide from Dow Corning, Midland, Mich.), that had been wiped three times with isopropanol and has two 100 μm thick spacer tapes attached on its two ends. A second glass slide is attached onto the adhesive under a force. Then the adhesive is fully cured under a UV source. The optical transmission is measured from wavelength 380 nm to 780 nm with a spectrometer Cary 300 from Agilent. One blank glass slide is used as the background.

The liquid optically clear photo-curable adhesive composition, to which this invention relates, demonstrates, among other, the following benefits. It shows an ultra low modulus as well as an ultra low hardness and almost no shrinkage. It shows excellent optical performance under harsh reliability condition. Due to the extreme low modulus and hardness, the adhesive will not impose any Mura to the LCD while significantly improve the performance of the LCD display. At least our invention enables the best possible prevention of Mura. The adhesive shows no yellowing after various reliability conditions. The adhesive has a long shelf life and shows good processability during lamination.

The inventive adhesive is suitable for application on uneven surfaces, can be used in large panels, is ideal for filling in gaps, avoids condensation and fogging, permits resistance to extreme temperatures, allows very thin display designs.

According to a preferred embodiment of this invention the urethane acrylate should preferably have a $T_g$ value from −80° C. to −10° C., in particular carry a UV-curable group of alkyl(meth)acrylate, and preferably should have a viscosity ranging from 5,000 to 500,000 mPa at 25° C. at a shear rate of 2.55 $s^{-1}$, measurable by HAAKE Rotational Rheometer with a cone plate (35 mm diameter). A preferred urethane acrylate is an aliphatic polyether urethane acrylate or acrylic ester.

$T_g$ is the glass transition temperature. The $T_g$ can preferably be determined by differential scanning calorimetry (DSC). This technique is well known to the person skilled in the art. In a preferred embodiment the glass transition temperature is determined by DSC at a heating rate of 10° C./min.

The urethane acrylate preferably comprises multifunctional polyether (meth)acrylate oligomer. The polyether (meth)acrylate oligomer comprise at least one (meth)acrylate groups, e.g., from 1 to 4 (meth)acrylate groups. Difunctional aliphatic urethane acrylate oligomers are preferred.

For example, the multifunctional urethane acrylate oligomer may be formed from an aliphatic polyester or polyether polyol prepared from condensation of a dicarboxylic acid, e.g., adipic acid or maleic acid, and an aliphatic diol, e.g. diethylene glycol or 1,6-hexane diol. In one embodiment, the polyester polyol may comprise adipic acid and diethylene glycol. The multifunctional isocyanate may comprise methylene dicyclohexylisocyanate or 1,6-hexamethylene diisocyanate. The hydroxy-functionalized acrylate may comprise a hydroxyalkyl acrylate such as 2-hydroxyethyl acrylate, 2-hydroxypropyl acrylate, 4-hydroxybutyl acrylate, or polyethylene glycol acrylate. In one embodiment, the multifunctional urethane acrylate oligomer may comprise the reaction product of a polyester polyol, methylene dicyclohexylisocyanate, and hydroxyethyl acrylate.

Suitable urethane acrylates, which can be used according to this invention, are for example aliphatic polyether urethane diacrylates, in particular BR-3042, BR-3641 AA, BR-3741 AB, and BR-344 available from Bomar Specialties Co., Torrington, Conn.

Other preferred aliphatic urethane acrylates are for example CN-9002, CN-980, CN-981, CN-9019 available from Sartomer Companry Inc, Exton, Pa. Urethane acrylate resins such as Genomer 4188/EHA, Genomer 4269/M22, Genomer 4425, and Genomer 1122, Genomer 6043 from Rahn AG, Switzerland are preferred, too. Urethane Acrylate Oligomers, like for example UV-3630ID80, UV-3630ID80, UV-NS054, and UV-NS077 from Nippon Soda, Tokyo, Japan are also preferred. Difunctional aliphatic polyester urethane acrylate oligomer as well as difunctional aliphatic polyester/ether urethane acrylate oligomer are preferred urethane acrylates, too.

According to a preferred embodiment of this invention the plasticizer is chosen from polyisoprene resin, polybutadiene resin, hydrogenated polybutadiene, xylene polymer, hydroxyl-terminated polybutadiene and/or hydroxyl-terminated polyolefin. Terpene polymer resin, phthalates, trimellitates, adipates, benzoate ester, hexanoate and/or dicarboxylate can be used as well. Of course other specialty plasticizers, which are available on the market, can also be used.

Suitable plasticizers like the polyisoprene resin, polybutadiene resin, hydrogenated polybutadiene, xylene polymer and so on may preferably have a number average molecular weight ($M_n$) of 50 to 50,000 and preferably a functionality of 0 to 1. Functionality means here the functional group which can participate in the curing reaction of acrylate, such as acrylate double bond. Hydroxyl group does not count as a functionality in this case.

Preferred polyisoprene resin and/or, polybutadiene resin, which can be used in this invention are for example Polybutadiene Polybd45CT, Polybd2000CT, Polybd3000CT, CN307 available from Sartomer Companry Inc, Exton, Pa. Polyisoprene LIR-30, LIR-50, LIR-290 available from Kuraray Co. Ltd, Tokyo, Japan can preferably be used, too. Polybutadiene TEA-1000, TE2000, GI-1000, GI-2000, GI-3000, BI-2000, BI-3000, JP-100, available from Nippon Soda Co Ltd, Tokyo, Japan can preferably be used, too. BI-2000, for example, is a hydrogenated 1,2-polybutadiene homopolymer with a number average molecular weight of around 2100. GI-2000, for example, is a hydroxy-terminated hydrogenated 1,2-polybutadiene, with a number average molecular weight of around 2100.

Other preferred plasticizers for example include Palatinol 810P, Palatinol DPHP, Plastomoll DNA from BASF Corporation, NJ, USA, and Admex 523 Polymeric Plasticizer, Admex 6996 Polymeric Plasticizer, TEG-EH plasticizer (Triethylene Glycol Bis (2-EthylHexanoate)), DOP plasticizer (Bis(2-Ethylhexyl) Phthalate) from Eastman Chemical Company, TN, USA.

According to a preferred embodiment of this invention the photo initiator is chosen from any one of the following or their combination:

2,2-dimethoxy-1,2-diphenylethyl-1-ketone; trimethylbenzoyldi-phenyl oxyphosphate; 1-hydroxylcyclohexyl benzophenone; and 2-methyl-1-[4-methylthiophenyl]-2-dimethylthiopropyl-1 ketone It is also possible to use other photo initiators.

Suitable examples of ingredients for the acrylate monomer and/or oligomer include methyl (meth)acrylate, ethyl (meth)acrylate, monoacrylate oligomer, monoacrylate oligomer with urea structure, 2-(2-ethoxyethoxy) ethyl acrylate, tetrahydrofurfuryl acrylate, lauryl acrylate, isooctyl acrylate, isodecyl acrylate, 2-ethylhexyl acrylate, 2-phenoxyethyl acrylate, isobornyl (meth)acrylate, dicyclopentenyloxyethyl methacrylate, dicyclopentadienyl methacrylate, 2-hydroxyethyl (meth)acrylate, 3-hydroxypropyl (meth)acrylate, 2-hydroxybutyl (meth)acrylate, 4-hydroxybutyl (meth)acrylate, octyl acrylamide, and combinations thereof. If an acrylate oligomer is chosen, it preferably has a $T_g$ value from −80° C. to 100° C.

The acrylate oligomer can preferably be made from (meth)acrylic monomers and can preferably have a weight average molecular weight ($M_w$) within the range of about 1000 to 15000. A preferred weight average molecular weight ($M_w$) can be around 2000. Mw can be determined by GPC.

In general, (meth)acrylate refers to both acrylate and methacrylate functionality. In general, "acrylate" refers to both acrylate and methacrylate functionality. "Acrylic ester" refers to both acrylic ester and methacrylic ester functionality.

Our invention leads to adhesives with ultra low hardness and ultra low elastic modulus as already pointed out. Thus, according to a preferred embodiment of this invention the hardness of the cured adhesive is 0 to 30 (shore 00), preferably 0 to 10 (shore 00), preferably determined in accordance with ASTM D 2240.

Hardness measurement in accordance with ASTM D 2240 is well known to the person skilled in the art. Preferably, the measurement of hardness can be done as follows:

The liquid optically clear adhesive is cured inside a container with a flat bottom. The amount of the adhesive is controlled so that the cured adhesive is about 6.4 mm thick. The specimen is placed on a hard flat surface. The indentor for the durometer (Model 1600 Dial-OO from Rex Gauge Co. Inc, IL, USA) is then pressed into the specimen making sure that it is parallel to the surface. The hardness is determined within one second of firm contact with the specimen.

According to another preferred embodiment of this invention the elastic modulus of the cured adhesive is $<5.0 \cdot 10^4$ Pa, preferably $<1.0 \cdot 10^4$ Pa.

Elastic modulus measurement is well known to the person skilled in the art. Preferably, the measurement of elastic modulus can be done using photorheometry. This is a convenient and well established technique for measurement of elastic modulus and well known to the person skilled in the art.

A preferred photoreometric measurement, which can preferably be applied to measure the elastic modulus, works as follows:

The preferred photoreometric measurement is done using a Physica MCR301 Photorheometer from Anton Paar GmbH, Germany. The photorheometer has a pair of parallel plates and the bottom plate is made of quartz. An UV light (with UVA intensity of 93 mW/cm2) is shined from a high pressure mercury arc (HPMA) lamp through the bottom plate to cure the adhesive sandwiched (with an initial gap of 1.00 mm) between the parallel plates which adhesive is tested under an oscillation mode (with a fixed angular frequency of 30 rad/s and 0.5% strain). The modulus is recorded with UV curing time. A zero fixed normal force (Fn) is used so that the gap is automatically reduced to accommodate sample shrinkage during curing.

According to another preferred embodiment of this invention the shrinkage of the cured adhesive is <1.5%, preferably <1%. This curing shrinkage can preferably be determined using photorheometry. This is a convenient and well established technique for measurement of shrinkage and well known to the person skilled in the art.

A preferred photoreometric measurement, which can preferably be applied to measure the shrinkage, works as follows:

The preferred photoreometric measurement is done using a Physica MCR301 Photorheometer from Anton Paar GmbH, Germany. The photorheometer has a pair of parallel plates and the bottom plate is made of quartz. An UV light (with UVA intensity of 93 mW/cm2) is shined from a high pressure mercury arc (HPMA) lamp through the bottom plate to cure the adhesive sandwiched (with an initial gap of 1.00 mm) between the parallel plates which adhesive is tested under an oscillation mode (with a fixed angular frequency of 30 rad/s and 0.5% strain). The modulus is recorded with UV curing time. A zero fixed normal force (Fn) is used so that the gap is automatically reduced to accommodate sample shrinkage during curing. Gap vs. cure is plotted to report linear curing shrinkage of the sample.

Especially low values in hardness, shrinkage and elastic modulus can be achieved with inventive adhesive compositions, which comprise
(a) 10 to 25 wt % of urethane acrylate resin,
(b) 30 to 70 wt % of plasticizer(s)
(c) 1.2 to 3.5 wt % of photo initiator
(d) 4 to 19 wt % of acrylate monomers.

A preferred adhesive composition of this invention comprises therefore
(a) 10 to 25 wt % of urethane acrylate resin,
(b) 30 to 70 wt % of plasticizer(s)
(c) 1.2 to 3.5 wt % of photo initiator
(d) 4 to 19 wt % of acrylate monomers,
with an elastic modulus of the cured adhesive which is $<5.0 \cdot 10^4$ Pa, preferably $<1.0 \cdot 10^4$ Pa, preferably determined using photorheometry.

Another preferred adhesive composition of this invention comprises therefore
(a) 10 to 25 wt % of urethane acrylate resin,
(b) 30 to 70 wt % of plasticizer(s)
(c) 1.2 to 3.5 wt % of photo initiator
(d) 4 to 19 wt % of acrylate monomers,
with a shrinkage of the cured adhesive, which is <1.5%, preferably <1%, preferably determined using photorheometry.

Another preferred adhesive composition of this invention comprises therefore
(a) 10 to 25 wt % of urethane acrylate resin,
(b) 30 to 70 wt % of plasticizer(s)
(c) 1.2 to 3.5 wt % of photo initiator
(d) 4 to 19 wt % of acrylate monomers,
with a hardness of the cured adhesive, which is 0 to 30 (shore 00), preferably 0 to 10 (shore 00), preferably determined in accordance with ASTM D 2240.

Another preferred adhesive composition of this invention comprises
(a) 10 to 25 wt % of urethane acrylate resin,
(b) 30 to 70 wt % of plasticizer(s)
(c) 1.2 to 3.5 wt % of photo initiator
(d) 4 to 19 wt % of acrylate monomers,
with a shrinkage of the cured adhesive, which is <1.5%, preferably <1%, preferably determined using photorheometry, a hardness of the cured adhesive, which is 0 to 30 (shore 00), preferably 0 to 10 (shore 00), preferably determined in accordance with ASTM D 2240, and an elastic modulus of the cured adhesive which is $<5.0 \cdot 10^4$ Pa, preferably $<1.0 \cdot 10^4$ Pa, preferably determined using photorheometry.

The adhesive composition according to this invention can, of course, contain additional optional ingredients. The person skilled in the art is familiar with them.

Especially preferred are additional ingredients selected from tackifier, antifoaming agents, antioxidant, and adhesion promoter.

Tackifiers are well known and are used to increase the tack or other properties of an adhesive. There are many different types of tackifiers but nearly any tackifier can be classified as a rosin resin derived from wood rosin, gum rosin or tall oil rosin; a hydrocarbon resin made from a petroleum based feedstock; or a terpene resin derived from terpene feedstocks of wood or certain fruits. The adhesive may comprise, e.g., from 0.001 wt % to about 20 wt %, from 0.01 wt % to about 15 wt %, or from 0.1 wt % to about 10 wt % of tackifier. The adhesive layer may also be substantially free of tackifier comprising, e.g., from 0.001 wt % to about 5 wt % or from about 0.001 wt % to about 0.5 wt % of tackifier all relative to the total weight of the adhesive. The adhesive may also be completely free of tackifier.

Another subject matter of this invention is a process for binding a top substrate to a base substrate, in which
(a) the liquid optically clear photo-curable adhesive, as described before, is applied onto the top side of the base substrate,
(b) the top substrate is attached on the adhesive layer of step (a),
(c) the adhesive is hardened by exposure to electromagnetic radiation comprising a wavelength ranging from 200 nm to 700 nm, preferably from 250 nm to 500 nm.

Another subject matter of this invention is a process for binding a top substrate to a base substrate, in which
(a) the liquid optically clear photo-curable adhesive, as described before, is applied onto the top side of the base substrate,
(b) the liquid optically clear photo-curable adhesive is cured by exposure to electromagnetic radiation comprising a wavelength ranging from 200 nm to 700 nm, preferably from 250 nm to 500 nm to form a gel layer,
(c) the top substrate is attached on the tacky gel layer of step (b),
(d) optionally, the adhesive is fully cured by exposure to electromagnetic radiation comprising a wavelength ranging from 200 nm to 700 nm, preferably from 250 nm to 500 nm.

Step (d) is only necessary, when the degree of cure of the liquid optically clear photo-curable adhesive after the curing step (b) is too low (for example degree of cure <60%) to provide adequate adhesive strength. According to the invention the curing degree can preferably be measured using a Fourier Transfer Infrared (FTIR) spectrometer with an ATR (attenuated total reflactance) fixture, such as Zinc Selenide crystal. The curing degree can be easily determined by measuring the decrease of the IR absorption at an absorption peak which is characteristic to the corresponding formulation chemistry, which is used. For example, IR absorption at 812 $cm^{-1}$ corresponds to the acrylate double bond, and can be used for measuring the curing degree of acrylate chemistry. This is well established and well known to the person skilled in the art.

It is also possible, that the liquid optically clear photo-curable adhesive is fully cured after the curing step (b).

An exemplary form of the detailed steps for measuring the curing degree of an acrylate based UV curable adhesive, which can preferably be applied, is given as follows:

First, the uncured adhesive is coated on the ATR fixture and then a FTIR spectrum around 812 $cm^{-1}$ is collected.

Second, the area ($A_0$) of this peak for the uncured adhesive is measured.

Third, the cured adhesive film is placed onto the ATR crystal surface.

Fourth, a FTIR spectrum around the same peak is collected, and the area of this peak ($A_1$) is measured.

Fifth, the curing degree can be calculated as follows:

Curing degree=$[(A_0-A_1)/A_0]*100$

In both processes for binding a top substrate to a base substrate, the liquid optically clear photo-curable adhesive should be applied onto the top side of the base substrate such that preferably a 50 µm to 600 µm thick layer of a liquid optically clear adhesive results. Preferably, a continuous layer of the adhesive should be applied.

UV-radiation can preferably be supplied using a high intensity continuously emitting system such as those available from Fusion UV Systems. A metal halide lamp, LED lamp, high-pressure mercury lamp, xenon lamp, Xenon flash lamp etc. can be used for UV-radiation. UV energy should be around 100 to 5,000 mJ/cm$^2$.

The "base substrate" in the context of this invention means the substrate, on which a top substrate will be attached to. The "base substrate" can be a display panel, for example, or a LCD. The optically clear photo-curable adhesive will be preferably applied on the top side of the base substrate. The "top substrate" is for example a cover lens.

The application of the optically clear photo-curable adhesive on the top side of the base substrate, which can be a display panel for example, can be done in the usual way, for example by a single or multi nozzle or a slit coater.

The top substrate, which is preferably a substantially transparent substrate, is attached to the gelled or liquid adhesive layer preferably under ambient condition or under vacuum condition. Vacuum conditions are especially preferred to guarantee the best possible bubble-free bonding. If vacuum conditions are used, then the vacuum level should preferably be around <100 Pa, preferably <10 Pa.

As used herein, "substantially transparent" refers to a substrate that is suitable for optical applications, e.g., has at least 85% transmission over the range of from 380 to 780 nm.

According to a preferred embodiment of the invention the top side of the base substrate is selected from glass and polymer, preferably plastic films, including in particular polyethylene terephthalate, polymethyl (meth)acrylate, and/or triacetate cellulose (TAC). A plastic film is a thin sheet of (preferably polymer and preferably transparent) material used to cover things. A preferred base substrate is a LCD module with polarizer film on top. In a further preferred case the TAC is the top surface of the polarizer. So, in such case, the adhesive will be directly bonded to the TAC surface.

According to another preferred embodiment of the invention the side of the top substrate, which shall be bonded, which is preferably a transparent substrate, is selected from glass and polymer, preferably plastic films, including in particular polyethylene terephthalate, polymethyl (meth) acrylate, and/or TAC.

The base substrate can be a display panel, preferably selected from a liquid crystal display, a plasma display, a light-emitting diode (LED) display, an electrophoretic display, and a cathode ray tube display, according to another preferred embodiment of the invention.

It is especially preferred that the display panel has touch functionality.

According to another preferred embodiment the top substrate is selected from a reflector, cover lens, touch panel, retarder film, retarder glass, a LCD, a lenticular lens, a mirror, an anti-glare or anti-reflective film, an anti-splinter film, a diffuser, or an electromagnetic interference filter. For example for 3D TV applications, a glass or film retarder will be bonded onto a LCD for passive 3D TV, or a TN LCD or lenticular lens is bonded a regular TFT LCD for naked eye 3D.

The adhesive of our invention as well as the process of our invention can be used for any touch panel sensor assembly. They can preferably be used to bond touch panel sensors that require two layers of indium-tin-oxide coated glass. They can preferably be used for cover lens bonding, in particular to fill the air gap in touch panel sensors that utilize a cover lens (such as clear plastic polymethyl (meth)acrylate) and the glass touch panel sensor. They can preferably be used for direct bonding, preferably to directly bond the cover lens to a LCD module.

Of course our invention comprises the possibility that two or more top substrates are bonded one after another on a base substrate, for example starting with a LCD as the base substrate, then bonding one layer of indium-tin-oxide coated glass on the base substrate with help of the liquid optically clear photo-curable adhesive, after that bonding another layer of indium-tin-oxide coated glass on it with the help liquid optically clear photo-curable adhesive, after this bonding a cover lens on it with the help liquid optically clear photo-curable adhesive.

A further subject matter of our invention is process of making an optical assembly comprising:

(a) providing a display panel and a top substrate, (b) disposing the liquid optically clear photo-curable adhesive, as described above, on the display panel, (c) curing the liquid optically clear photo-curable adhesive by exposing it to electromagnetic radiation comprising a wavelength ranging from 200 nm to 700 nm, preferably from 250 nm to 500 nm to form a gel layer, (d) applying the top substrate on the gelled adhesive layer of step (c), (e) optionally exposing the optical assembly to electromagnetic radiation comprising a wavelength ranging from 200 nm to 700 nm, preferably from 250 nm to 500 nm to fully cure the adhesive.

As explained above, step (e) is only necessary, when the degree of cure of the liquid optically clear photo-curable adhesive after the curing step (c) is too low, for example <60%.

It is also possible, that the liquid optically clear photo-curable adhesive is fully cured after the curing step (b).

A further subject matter of our invention is a process of making an optical assembly comprising:

(a) providing a display panel and a top substrate, (b) disposing the liquid optically clear photo-curable adhesive, as described above, on the display panel, (c) applying the top substrate on the adhesive layer of step (b), (e) exposing the optical assembly to electromagnetic radiation comprising a wavelength ranging from 200 nm to 700 nm, preferably from 250 nm to 500 nm to fully cure the adhesive.

Another subject matter of this invention is the use of the inventive liquid adhesive composition on liquid crystal displays to fix the touch screen on the base substrate. The base substrate can be a display panel, preferably selected from a liquid crystal display, a plasma display, a light-emitting diode (LED) display, an electrophoretic display, and a cathode ray tube display.

According to another preferred embodiment of the invention the top substrate is selected from a reflector, cover lens, touch panel, retarder film, retarder glass, a LCD, a lenticular lens, a mirror, an anti-glare or anti-reflective film, an anti-splinter film, a diffuser, or an electromagnetic interference filter. For example for 3D TV applications, a glass or film retarder will be bonded onto a LCD for passive 3D TV, or a TN LCD or lenticular lens is bonded a regular TFT LCD for naked eye 3D.

The use of said liquid optically clear photo-curable adhesive for bonding parts of optical assemblies is another subject matter of this invention. The use of the inventive liquid optically clear photo-curable adhesive for touch panel sensor assembly, preferably to bond touch panel sensors that require two layers of ITO (indium-tin-oxide) coated glass is another subject matter of this invention. The use of said liquid optically clear photo-curable adhesive for cover lens bonding, preferably to fill the air gap in touch panel sensors that utilize a cover lens and the glass touch panel sensor is another subject matter of this invention. The use of said liquid optically clear photo-curable adhesive for directly bonding the cover lens to a LCD module is another subject matter of this invention.

The use of the inventive liquid adhesive composition for a prevention of Mura in optical assemblies is another subject matter of this invention.

Our invention is applicable in all fields of mobile phone, tablet PC, TV, notebook PC, digital camera, photo frame, car navigation, outdoor display etc.

EXAMPLE

The following liquid optically clear photo-curable adhesive was prepared by mixing all ingredients to obtain a homogeneous mixture away from light.

| | |
|---|---|
| UV-3630ID80 (Urethane Acrylate Oligomer from Nippon Gohsei, diluted in 20% isodecyl acrylate) | 15 wt % |
| Lauryl acrylate | 10 wt % |
| Isobornyl acrylate | 5.8 wt % |
| 2-Hydroxyethyl methyacrylate | 3.0 wt % |
| BI-2000 (Hydrogenated polybutadiene from Nippon Soda Co. Ltd) | 55 wt % |
| Palatinol ® DPHP-I [plasticizer] (Di-2 propyl heptyl Phthalate, CAS# 53306-54-0, from BASF) | 10 wt % |
| Speedcure TPO (2,4,6-Trimethylbenzoyl diphenyl phosphine oxide) | 0.3 wt % |
| Irgacure 184D (1-Hydroxycyclohexyl phenyl ketone) | 0.9 wt % |

This liquid optically clear photo-curable adhesive was used in a process of making an optical assembly comprising:
(a) providing a display panel and a cover lens,
(b) disposing the liquid optically clear photo-curable adhesive, as described above, on the display panel,
(c) applying the cover lens on the adhesive layer of step (b),
(d) exposing the optical assembly to electromagnetic radiation comprising a wavelength ranging from 200 nm to 700 nm.

This liquid optically clear photo-curable adhesive enabled the bonding of the cover lens to the display panel without any Mura problem. Even when stress was imposed to the display panel no Mura could be detected.

What is claimed is:

1. A liquid photo-curable adhesive composition comprising:
    (a) 5 to 30 wt % of urethane acrylate, having a $T_g$ value from −80° C. to −10° C., and a viscosity ranging from 5,000 to 500,000 mPa at 25° C. at a shear rate of 2.55 $s^{-1}$,
    (b) 30 to 80 wt % of plasticizer,
    (c) 0.02 to 5 wt % of photo initiator,
    (d) 1 to 30 wt % of acrylate monomers and/or acrylate oligomer, wherein the acrylate oligomer has a $T_g$ value from −80° C. to 100° C.,
wherein the hardness of the cured adhesive is 0 to 30 (shore 00), determined in accordance with ASTM D 2240, wherein the elastic modulus of the cured adhesive is $<5.0 \cdot 10^4$ Pa, determined using photorheometry, wherein the shrinkage of the cured adhesive is <1.5%, determined using photorheometry.

2. Adhesive composition according to claim 1, wherein the urethane acrylate is an aliphatic polyether urethane acrylate.

3. Adhesive composition according to claim 1, wherein the plasticizer is selected from the group consisting of polyisoprene resin, polybutadiene resin, hydrogenated polybutadiene, xylene polymer, hydroxyl-terminated polybutadiene and hydroxyl-terminated polyolefin.

4. Adhesive composition according to claim 1, wherein the photo initiator is selected from the group consisting of 2,2-dimethoxyl-1,2-diphenylethyl-1-ketone; trimethylbenzoyldi-phenyl oxyphosphate; 1-hydroxylcyclohexyl benzophenone; 2-methyl-1-[4-methylthiophenyl]-2-dimethylthiopropyl-1-ketone and combinations thereof.

5. Adhesive composition according to claim 1 comprising:
    (a) 10 to 25 wt % of the urethane acrylate,
    (b) 30 to 70 wt % of the plasticizer,
    (c) 1.2 to 3.5 wt % of the photo initiator, and
    (d) 4 to 19 wt % of the acrylate monomers.

6. Adhesive composition according to claim 1, which comprises additional ingredients selected from the group consisting of tackifier, antifoaming agent, antioxidant, and adhesion promoter.

* * * * *